No. 821,360. PATENTED MAY 22, 1906.
F. B. HINKSON.
FILTER.
APPLICATION FILED MAY 3, 1905.
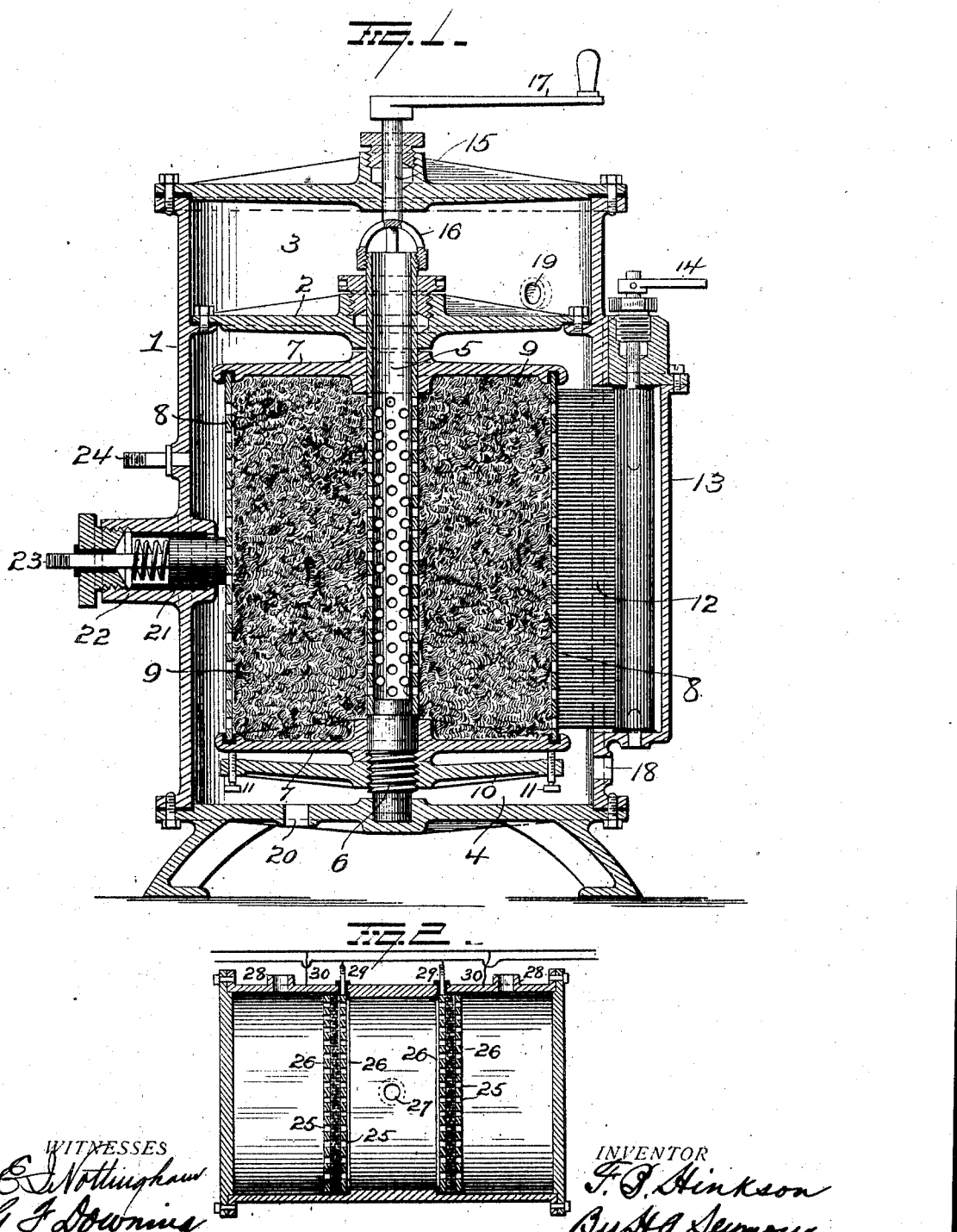

UNITED STATES PATENT OFFICE.

FRANK B. HINKSON, OF NEW CASTLE, PENNSYLVANIA, ASSIGNOR TO THE ELECTRIC LIQUID PURIFYING AND FILTERING COMPANY, OF PITTSBURG, PENNSYLVANIA.

FILTER.

No. 821,360.   Specification of Letters Patent.   Patented May 22, 1906.

Application filed May 3, 1905. Serial No. 258,602.

*To all whom it may concern:*

Be it known that I, FRANK B. HINKSON, a resident of New Castle, in the county of Lawrence and State of Pennsylvania, have invented certain new and useful Improvements in Filters; and I do hereby declare the following to be a full, clear, and exact description of the invention, such as will enable others skilled in the art to which it appertains to make and use the same.

My invention relates to an improved filter, and more particularly to an improved filter wherein an electric current is employed to destroy all bacteria and also throw down impurities; and the invention consists in certain novel features of construction and combination and arrangements of parts, as will be more fully hereinafter described, and pointed out in the claims.

In the accompanying drawings, Figure 1 is a view in vertical section, illustrating my improvements; and Fig. 2 is a similar view of a modification.

1 represents a filter-casing divided near its upper end by a partition 2 into an upper chamber 3 for filtered water and a lower chamber 4, in which the filtering is accomplished. A perforated pipe 5 is mounted to turn in partition 2 and has a plug 6 closing its lower end and having a thrust-bearing in the casing-bottom. Disks 7 are secured on pipe 5 and plug 6 and are made on their adjacent faces with circular grooves to receive the opposite ends of a perforated metal cylinder 8, said cylinder being insulated from the disks 7 by insulating material in the grooves. The space between the cylinder 8 and pipe 5 and between the disks 7 is packed with mineral wool or similar filtering material 10, so that the water in its passage through the same to pipe 5 will be cleansed.

A disk 10 is screwed onto plug 6 below lower disk 7 and carries set-screws 11 to engage lower disk 7 and exactly position the filtering-cylinder.

A brush 12 is located in an offset portion 13 of cylinder 1 and has an operating-arm 14 above the offset portion to permit the brush to be moved into or out of engagement at the will of the operator, and a shaft 15 is secured by a spidered cap 16 to the upper end of pipe 5, projects through the top of casing 1, and has a crank-arm 17 or other means thereon to permit the cylinder to be revolved with the brush 12 thereagainst to clean the same.

Water enters at post 18, passes through the filtering medium, up through pipe 5 into chamber 3, and escapes at a port 19, and a port 20 is provided in the casing-bottom, through which the sediment can be forced out.

A spring-pressed contact-plunger 21 is located in and insulated from a sleeve 22 in the wall of casing 1 and normally contacts with cylinder 8, and one terminal, 23, of an electric generator connects with this plunger 21, while the other terminal, 24, of said electric generator is secured in casing-wall 1. By this arrangement of parts the cylinder 8 is charged with electricity, and as the cylinder is insulated from the disks 7 the current must jump across the water between the cylinder and casing-wall, thoroughly impregnating the water with electricity and most effectually destroying bacteria and throwing down other impurities.

While aluminium has been found very effective as the cylinder and plunger, other metals or material other than metal may be employed, and I do not restrict myself to any particular material for the purpose.

In the modified form shown in Fig. 2 I confine filtering material 25 between perforated disks 26 and compel the water which enters at 27 to be charged with an electric current in its passage through the disks and filtering material and escapes at the ports 28. 29 and 30 indicate the electric connections with the casing and plates; but these connections might be otherwise made, and as many of said filtering mediums may be employed in a single receptacle as desired.

Other changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a filter, the combination with a casing of electrically-conducting material and having water inlet and outlet ports, of a perforated shell of electrically-conducting material located within said casing, an electric circuit including said casing and shell, and filtering material within said shell.

2. In a filter, the combination of a rotary filter comprising an outer perforated receptacle, means for electrically charging said receptacle and filtering material confined within the receptacle.

3. In a filter, the combination of a rotary filter comprising an outer perforated receptacle, means for electrically charging the same, filtering material within said receptacle, and an electric contact spring-pressed plunger engaging said receptacle.

4. In a filter, the combination of a metal covered filter, and a metal casing inclosing the same, and an electric circuit including the metal covering of said filter and the metal casing.

In testimony whereof I have signed this specification in the presence of two subscribing witnesses.

FRANK B. HINKSON.

Witnesses:
JOSEPH M. FLANNERY,
GODFREY W. LERCH.